Jan. 11, 1966 J. W. WASELESKI, JR., ET AL 3,228,805

METHOD OF PRODUCING HOMOGENEOUS THERMOELECTRIC ALLOY SLUGS

Filed Sept. 17, 1962 2 Sheets-Sheet 1

Ernest M. Jost,
Joseph W. Waseleski, Jr.,
Inventors.
Koenig, Pope, Senniger,
and Powers,
Attorneys.

Jan. 11, 1966 J. W. WASELESKI, JR., ET AL 3,228,805

METHOD OF PRODUCING HOMOGENEOUS THERMOELECTRIC ALLOY SLUGS

Filed Sept. 17, 1962 2 Sheets-Sheet 2

Ernest M. Jost,
Joseph W. Waseleski Jr.,
Inventors.
Koenig, Pope, Senniger and Powers,
Attorneys.

United States Patent Office 3,228,805

Patented Jan. 11, 1966

3,228,805

METHOD OF PRODUCING HOMOGENEOUS THERMOELECTRIC ALLOY SLUGS

Joseph W. Waseleski, Jr., Foxboro, and Ernest M. Jost, Attleboro, Mass., assignors to Texas Instruments Incorporated, Dallas, Tex., a corporation of Delaware Filed Sept. 17, 1962, Ser. No. 226,767

4 Claims. (Cl. 148—2)

This invention relates to the production of semiconductor alloys, and with regard to certain more specific features, to the production of certain N-type and P-type thermoelectric alloys which are useful in the construction of thermoelectric cooling and heating devices.

Among the several objects of the invention may be noted the provision of an improved method for the preparation of homogeneous thermoelectric alloys which will remain stable when used in thermoelectric devices; the provision of a method which avoids deterioration of the alloys during production; the provision of a low-cost commercially useful method which reduces the production time required and which avoids complex apparatus and intricate controls such as were heretofore employed; and the provision of a method which will produce thermoelectric alloys of both the P and N types equal to or better in quality than those formerly obtained, particularly as regards thermoelectric power and electrical conductivity. Other objects and features will be in part apparent and in part pointed out hereinafter.

The invention accordingly comprises the elements and combinations of elements, ingredients and combinations of ingredients, the proportions thereof, steps and sequence of steps, and features of construction, composition and manipulation, and arrangements of parts which will be exemplified in the structures, products and methods hereinafter described, and the scope of which will be indicated in the following claims.

Figures 1, 3:
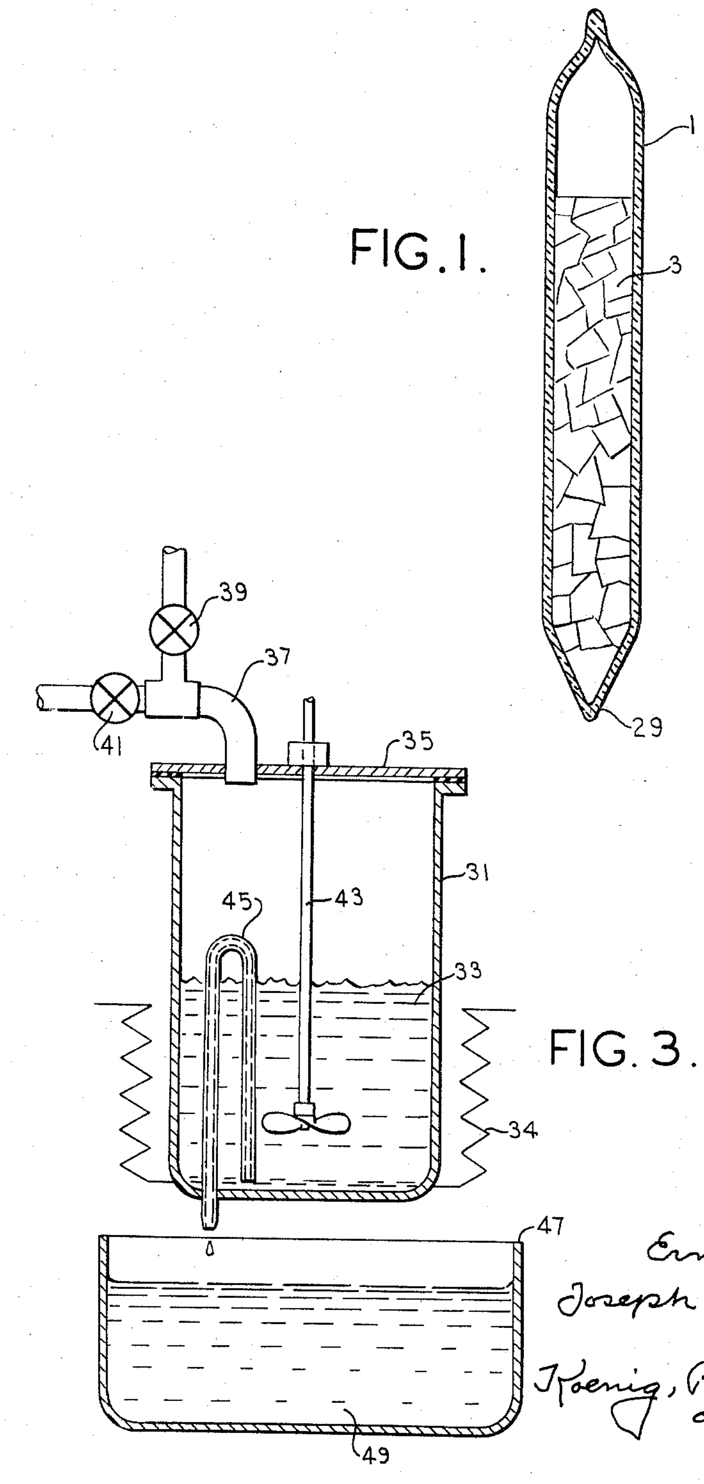
Figure 2:
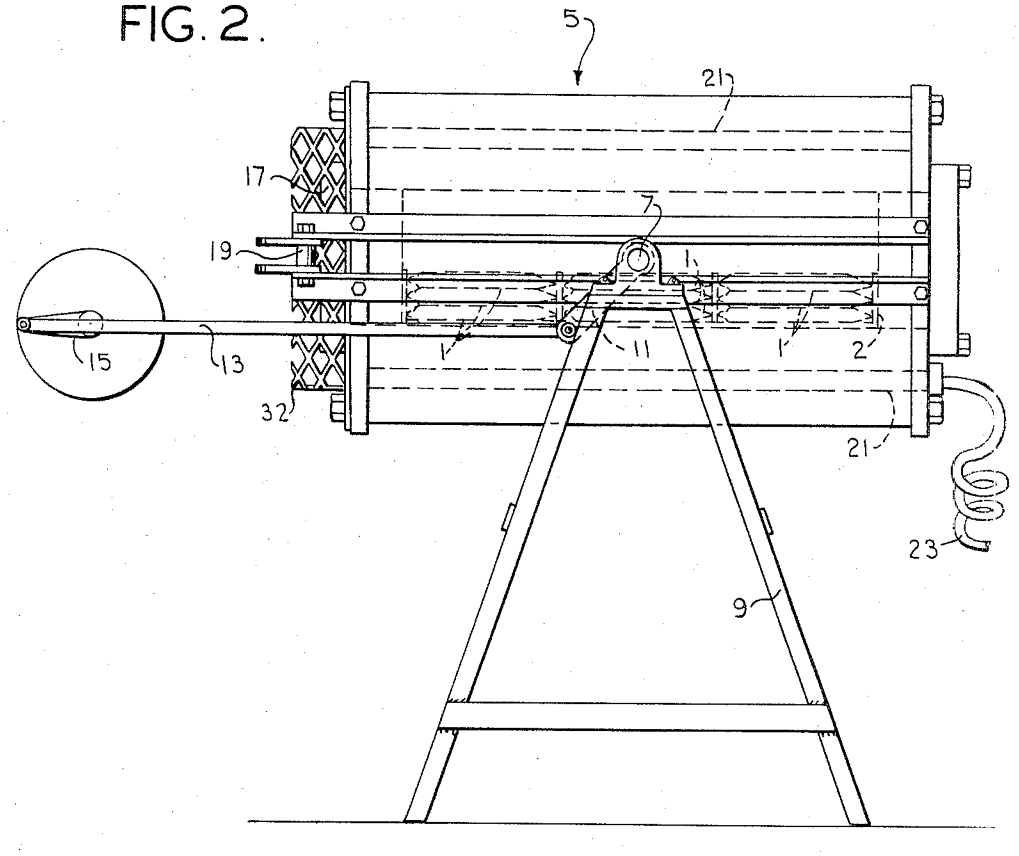

In the accompanying drawings, in which several of various possible embodiments of the invention are illustrated, FIG. 1 is a longitudinal section of a container prepared for carrying out one form of the invention;

FIG. 2 is a diagrammatic side elevation of a furnace for rocking containers of the type shown in FIG. 1; and FIG. 3 is a diagrammatic view of parts for carrying out another form of the invention.

Corresponding reference characters indicate corresponding parts throughout the several views of the drawings.

Various alloys of bismuth (Bi), antimony (Sb), tellurium (Te), selenium (Se), lead (Pb) and tin (Sn), for example, are useful for producing thermoelectric alloys of the type herein envisaged. There are various permutations of these that may be employed. One bismuth system for P-type alloys accords to the formula $$Bi_{2-x}Sb_xTe_{3-y}Se_y \qquad (1)$$

where $x$ may be a number ranging from 0–2; and $y$ may be a number ranging from 0–3. Thus, by way of example, when $x$ and $y$ are 0, bismuth telluride ($Bi_2Te_3$) may be obtained; when $x=2$ and $y=3$, antimony selenide ($Sb_2Se_3$) may be obtained; when $x=2$ and $y=0$, antimony telluride ($Sb_2Te_3$) may be obtained; et cetera. Although each of the above P-type examples involves a two-element alloy, it is to be understood that alloys involving more than two elements may be obtained, such as, for example, ($Bi_1Sb_1Te_2Se_1$). Other combinations also occur, depending upon the selections of values for $x$ and $y$. A bismuth system for making N-type alloys accords to the formula $$Bi_2Te_{3-y}Se_y \qquad (2)$$

where $y$ ranges from 0 to 2.99. A lead system for P and N types of thermoelectric alloys accords to the formula $$(100-X)\%PbTe(X)\%Snte \qquad (3)$$

where X is 1 to 99% by weight of composition. The stated thermoelectric alloys in these systems may be doped or undoped, as circumstances require. The term thermoelectric alloy as used herein intended to include alloys of the class described either doped or undoped. Combinations of some other materials also form thermoelectric alloys but those above-mentioned are those preferred in carrying out the invention.

Formerly, mixtures of the desired components of alloys such as those above mentioned were placed in molds and slowly lowered through a heating furnace and then through a sharp temperature gradient such that the alloy would solidify in equilibrium with the molten phase, while crystallizing. While this method was satisfactory for experimental work and low production rates, it is not well suited for industrial production, nor for consistent production of the highly stable and uniform materials required for thermoelectric applications. Moreover, the output of a typical furnace was only approximately 10–20 grams per hour, for example.

Prior methods employed in connection with the stated alloys have produced materials often found to be unstable when used in thermoelectric generators. This was believed to have been the result of an inhomogeneity caused by solidification of phases of varying compositions during cooling. An alloy as formerly made might be rich in contained grains of one constituent making it unstable. Compositions rich in Te were, for example, subject to attack by air and moisture, which caused the instability. The invention avoids such results. Moreover, certain stirring and heating-treating steps are employed which permit of homogenization in shorter periods of time than was possible with methods which required extended heat-treating steps after the material was prepared.

Thus according to the present invention, considerably faster production rates can be maintained and thermoelectric alloys produced having improved properties.

Referring now more particularly to FIG. 1 of the drawings, illustrating a form of the invention for making doped or undoped alloys according to Formulas 1 and 2, there is shown at numeral 1 a container or vessel in the form of an ampule composed of quartz, Vicor or graphite. Vicor is a high silicon dioxide glass. The ampule shown is approximately 7 mm. inside diameter and may be of any desired length. Quantities, for example, stoichiometric quantities, of constituents made particulate as by crushing, and indicated at 3, are infilled into the ampule 1. In order to provide a protective atmosphere, the ampule is evacuated and sealed shut, or in some cases an inert atmosphere such as of helium or argon or a reducing atmosphere, e.g., hydrogen, may be sealed in the tube for the purpose. Proper amounts of desired doping agents (if required) are included. Examples of typical doping agents for the stated alloys are bismuth, lead, iodine, bromine, tellurium and chlorine. Preferably, and as shown, the ampule is not completely filled with the alloy constituents, so that the shaking of the same, to be described, will result in good mixing.

Any desired number of the ampules 1 are shaken by placing them in a rocking furnace, indicated at 5 in FIG. 2. The furnace 5 is shown as being pivoted at 7 in a supporting frame 9 and adapted to be rocked to alternate 45° angles (for example) from the horizontal position shown. Rocking may be accomplished by a lever 11, driven by means of a connecting rod 13 actuated from a rotating crank 15. The rocking agitates or stirs the contents of the ampule 1. The furnace 5 includes a suitable loading door 17, hinged at 19, and electrical heating elements shown at 21. Current is supplied over an electrical lead 23 extending from a suitable source of electric current. Numeral 32 indicates a safety grill attached to the furnace 5 around its door 17. An ampule support appears at 2.

While the ampules are being rocked in the furnace 5 to stir their contents they are maintained at a first elevated temperature in a melt range. This in the case of a bismuth system may, for example, be approximately 585°–850° C., the exact temperature depending upon the melting point of the particular alloy being made. The purpose of this step is to melt the alloy constituents under the protective atmosphere and to produce a complete reaction therebetween. The stirring by rocking and heating is continued at the stated first elevated temperature for approximately from one to five hours.

After the alloying reaction is complete, rocking is terminated and heating is so reduced as to cause the ampule to cool slowly to the solidus temperature of its contents. For some of the alloys in the bismuth system this solidus temperature range may be, for example, approximately 585°–650° C. A preferred satisfactory cooling rate to the solidus is approximately 1°–2° C. per minute. At this the furnace is preferably in a tilted stationary position. As the temperature is reduced, the alloy solidifies. Annealing may be carried out by maintaining the material at the solidus temperature or lower (but in no event higher than the melting temperature) to provide a heat treatment for about two to twenty-four hours, depending on the alloy being made and the temperature of annealing. For example, for P-type $$Bi_{0.52}Sb_{1.48}Te_{2.89}Se_{0.11}$$

material, an example of a suitable annealing temperature is 540° C. for a period of about eighteen hours. During the second heat treatment the alloy will recrystallize with a grain orientation in a preferred direction, namely, parallel to the axis of the ampule 1 because transverse crystal growth is limited by the small diameter of the ampule 1 while longitudinal crystal growth is unimpeded in the direction of the length of the ampule. For a preferred direction of grain orientation to develop, the inside diameter of the ampule preferably should not exceed about 2.54 cm. and have a length several times its diameter. Crystallization starts at the point 29 which forms the end of the ampule, because such a point cools faster than the remainder of the ampule.

In the case of a lead telluride system such as above mentioned heating while rocking may be at approximately 1030°–1050° C. for approximately one and one-half hours, after which rocking is stopped. Then the temperature is lowered to approximately 835°–840° C. and so held for approximately ten to fifteen hours to effect a heat treatment of the solid alloy. Finally the temperature is lowered to room temperature at a rate of approximately 2° C. per minute.

After the completion of the steps above mentioned, the alloy is removed from the ampules 1 by breaking them. The alloy can then be used as such or hot-pressed into suitable shapes for use in thermo-electric devices.

In both of the examples above given, the first heat treatment of the alloys while under the protective atmosphere in the rocking ampules speeds up the alloying reactions and assures more nearly complete reactions. These reactions occur in the absence of air and moisture. The second heat treatment at the lower temperature after the reacted materials have solidified has a homogenizing effect, also in the absence of air and moisture. The gradualness by which the second lower heat-treating temperature is reached favors preferential crystal growth and orientation along the length of the ampule 1. The gradual temperature drop and the second temperature treatment have crystallizing and annealing functions.

Referring now more particularly to FIG. 3, there is shown an alternative form of the invention which is useful for alloys wherein less preferential and more random crystal growth is acceptable or desired. In this case a suitable vessel 31 is provided for the materials 33 to be alloyed. Surrounding the vessel 33 is a suitable heater 34. The vessel has a sealed cover 35 wherein is a connection 37 having a valve 39 for abstracting air and another valve 41 for introducing argon, for example. The cover 35 also carries a stirring device 43. At numeral 45 is shown a U-shaped outlet for efflux of the material 33 when molten. At numeral 47 is a vessel containing a liquid coolant such as water 49.

In the form of the invention shown in FIG. 3, the materials 33 are stirred by member 43 under an atmosphere of argon at a first elevated temperature, for example, for the bismuth system, of approximately 585°–1050° C. for approximately one to sixty minutes. It will be understood that the melting temperature and time at this temperature will vary depending on the particular materials employed. Then the argon pressure is increased so that the molten metal is pushed drop-wise from the pipe 45 and into the coolant 49. Here it solidifies in the form of pellets approximately 2 mm. in diameter. The size of the tube 45 is selected to produce the proper drop size. In pellets thus rapidly cooled, crystal formation is random. The pellets are then given a second heat treatment. The heat treatment when the pellets are PbTe is carried out at a temperature of approximately 500°–850° C. for approximately two to twenty-four hours in evacuated ampules such as above described. During this heat treatment the ampules may or may not be rocked. They retain their solid form.

After their second heat treatment in the ampules, the pellets are removed therefrom and, either before or after having reached room temperature, are hot-pressed under pressures, for example, in the range of approximately 5,000–10,000 p.s.i. at temperatures of approximately 300°–600° C. The results are thermoelectric slugs having the stable properties desired.

In the FIG. 3 form of the invention, the reaction, while stirring in a protective atmosphere occurs in the chamber 31 instead of in the ampules, and the second and lower heat treatment occurs after the pellets have been formed.

It will be noted that in all forms of the invention a first mechanical homogenizing effect is obtained by the stirring of the molten constituents of the alloys while under a protective atmosphere and under temperature conditions wherein a liquid state exists. Also, in all forms a solid-state homogenizing effect is obtained by the heat treatment at the lower temperature in the solid-phase, which tends to eliminate segregation during recrystallization. The form of the invention illustrated by FIGS. 1 and 2 favors ordered crystal alignment and orientation along the length of the ampules upon solidification. The form shown in FIG. 3 results in more random formation of crystals in the pellets.

Equilibrium after solidification is not changed by breaking up the product, as for example by pulverizing in a ball mill. The powder so produced can be hot pressed into desired shapes at a temperature below the heat-treating temperature to maintain the same properties as the cast and heat-treated material.

The phrase protective atmosphere as used herein includes a vacuum, a reducing gas or an inert gas.

In view of the above, it will be seen that the several objects of the invention are achieved and other advantageous results attained.

As various changes could be made in the above structures, products and methods without departing from the scope of the invention, it is intended that all matter contained in the above description or shown in the accompanying drawings shall be interpreted as illustrative and not in a limiting sense.

What is claimed is:

1. The method of producing homogeneous thermoelectric alloy slugs of constituents selected from the group consisting of bismuth, lead, antimony, tellurium, selenium and tin, comprising stirring constituents selected from said group and heating them at a first elevated temperature while in a container under a protective atmosphere for a time adapted to melt and substantially react them to form an alloy, removing the melt dropwise from the container into a coolant for rapid cooling to solidify and crystallize the alloy into pellets, placing the pellets in a vessel containing a protective atmosphere, heating the last-named vessel and its contents at a second elevated temperature which is less than the melting temperature of said pellets to reduce segregation of the crystallized constituents of the pellets, removing the heat treated pellets from the container and pressing them into slugs.

2. The method of producing thermoelectric alloy slugs having constituents selected from the group consisting of bismuth, antimony, tellurium and selenium, comprising placing a mixture of selected constituents in particulate form in an hermetically sealed first vessel containing a protective atmosphere, heating the constituents in the vessel at a first elevated temperature in the range of approximately 585°–1050° C. to melt and substantially react them to form a desired melted alloy, stirring the constituents of the melted alloy in the vessel while at said elevated temperature, passing the melted alloy dropwise from said vessel into a coolant to form solidified crystallized alloy pellets, placing said pellets in a second vessel containing a protective atmosphere, then heat-treating the pellets therein at an elevated temperature not exceeding the melting temperature of said alloy for approximately two to twenty-four hours to minimize segregation in the pellets, removing the pellets from the container and pressing them into slugs.

3. The method according to claim 2, wherein the pressing is carried out at a temperature in the range of 300–600° C. and under pressure in the range of approximately 5,000–10,000 p.s.i. to form the slugs.

4. The method of producing homogeneous thermoelectric alloy slugs of constituents selected from the group consisting of bismuth, lead, antimony, tellurium, selenium and tin, comprising stirring the constituents and heating them at a first elevated temperature while under a protective atmosphere in a sealed container for a time adapted to form a melt and substantially react them to form an alloy of the melt, increasing the pressure of said atmosphere in the container to force the melt in drops from an outlet communicating with the inside of the container through a passage extending to an inlet point below the surface of the melt, receiving the drops in a coolant for rapid cooling to solidify the drops into pellets, placing the pellets in a sealed vessel containing a protective atmosphere, heating the last-named vessel and its contents at a second elevated temperature which is less than the melting temperature of said pellets to minimize segregation in the pellets, removing the pellets from the container and hot-pressing them into slugs.

References Cited by the Examiner

UNITED STATES PATENTS

| | | | |
|---|---|---|---|
| 2,287,029 | 6/1942 | Dowdell | 264—13 |
| 2,662,764 | 12/1953 | Arutunoff | 266—33 |
| 2,680,609 | 6/1954 | Arutunoff | 266—33 |
| 2,738,548 | 3/1956 | Kassell | 18—2.7 |
| 2,944,975 | 7/1960 | Foldberth | 252—62.3 |
| 2,964,400 | 12/1960 | Brennan | 264—111 XR |
| 2,976,192 | 3/1961 | Saarivirta et al. | 148—3 |
| 3,070,837 | 1/1963 | Loertscher | 18—2.7 |
| 3,096,287 | 7/1963 | Rabenau | 252—62.3 |

FOREIGN PATENTS

| | | |
|---|---|---|
| 546,228 | 9/1956 | Belgium. |
| 625,941 | 7/1949 | Great Britain. |

ALEXANDER H. BRODMERKEL, *Primary Examiner.*

BENJAMIN HENKIN, *Examiner.*